Patented Oct. 25, 1949

2,485,635

UNITED STATES PATENT OFFICE 2,485,635

POTATO PRODUCTS AND PROCESSES OF PREPARING SAME

Ralph H. Neal, North Bergen, N. J., Chester M. Gooding, Staten Island, N. Y., and Hans W. Vahlteich, Edgewater, N. J., assignors to The Best Foods, Inc., New York, N. Y., a corporation of New Jersey No Drawing. Application July 8, 1947, Serial No. 759,700

15 Claims. (Cl. 99—154)

1

This application is a continuation-in-part of applicants' copending applications, Serial Numbers 608,101 filed July 31, 1945, 608,102 filed July 31, 1945, and 608,380 filed August 1, 1945.

This invention relates to potatoes and more particularly to potatoes or portions thereof which are fried in glyceridic oil.

An object of this invention is to retard the deterioration of potatoes or portions thereof fried in glyceridic oil.

Another object of this invention is to prevent the so-called off-flavor or flavor reversion of fried potato products, such as potato chips, which have been stored for a period of time.

Potato products which are fried in glyceridic oil, such as potato chips, are prone to become rancid after standing for a period of time. Since potato chips frequently remain on a retailer's shelf for several weeks after their production, this rancidity or off-flavor is a serious problem in the marketing of fried potato products such as potato chips. For example, potato chips which are produced by frying in lard, after storage at 95° F. for five weeks, manifest a strong, rancid flavor. This deterioration or off-flavor of potato chips after storage poses a serious problem, especially in situations where storage for a period of weeks is necessarily incident in the sale of the potato chips to the consuming public.

In accordance with this invention, potato products, such as potato chips or so-called French fried potatoes, are produced which remain in relatively good condition from a deterioration or rancidity standpoint after storage for relatively prolonged periods. Potato products, such as potato chips, which are fried in certain glyceridic oils, such as deodorized soya bean oil, sometimes develop an off-flavor which is called flavor reversion. This development of off-flavor appears to be differentiated from the rancidity of the oil and is usually discernible before the rancidity becomes manifest quantitatively. The potato products of this invention are not subject to the usual rapid development of this off-flavor. These potato products are produced by frying in a glyceridic oil, whether of animal or vegetable origin, which contains a monoalkyl or a monoalkylene ester of citric acid. If the glyceridic oil be of vegetable origin, a dialkyl or dialkylene ester of citric acid may be incorporated in the glyceridic oil employed for the frying. The amount of monoalkyl, monoalkylene, dialkyl or dialkylene esters of citric acid which may be incorporated in the oil may be desirably within the range of .002 to 1% and preferably within the range of .01 to .1% by weight of

2 the glyceridic oil. The glyceridic oil may contain a single monoalkyl or monoalkylene ester of citric acid or a plurality of monalkyl or monoalkylene esters of citric acid, and if the glyceridic oil be a vegetable oil, the oil may contain a single dialkyl or dialkylene ester of citric acid or a plurality of diesters.

In some cases, the monoalkyl or monoalkylene esters of citric acid are not soluble or miscible to a sufficient degree in the glyceridic oil. To disperse the monoalkyl or monoalkylene ester of citric acid throughout the glyceridic oil, a solubilizing or oil-coupling agent is employed. Examples of satisfactory solubilizing agents for this purpose are the di-and tri-alkyl or -alkylene esters of citric acid, in which the alkyl or alkylene group has at least 8 carbon atoms, unsubstituted aliphatic alcohols having at least 6 carbon atoms, monocarboxylic acids having at least 10 carbon atoms and monoglycerides of fatty acids, the fatty acids having at least 10 carbon atoms. When a solubilizing agent is employed, the monoester of citric acid is first dissolved in the solubilizing agent, and the resulting mixture is incorporated in the glyceridic oil. Di- and tri-alkyl and -alkylene esters of citric acid in which the alkyl or alkylene group has at least 8 carbon atoms, have been found very satisfactory for solubilizing the monoalkyl or monoalkylene ester of citric acid. The incorporation in glyceridic oil, and particularly in refined, hydrogenated and deodorized glyceridic oil, of a mixture of mono- and di-alkyl or mono- and di-alkylene esters of citric acid or a mixture of mono-, di- and tri-alkyl or mono-, di- and tri-alkylene esters of citric acid, has been found effective for preventing the development of off-flavor.

The superiority of the potato products of this invention over those heretofor available is shown by a comparison of the flavor of potato chips produced by frying in lard to which monostearyl citrate was added, the same lard to which distearyl citrate was added and the same lard to which no ester of citric acid was added. These potato chips, after preparation under identical conditions, were stored for a period of five weeks and their flavor determined by a number of experts skilled in discerning flavor differences. Moreover, in order to determine the amount of rancidity of the oil in the potato chips after this five week period, the oil in the potato chips was solvent extracted and the peroxide value of that oil ascertained.

In the production of the potato chips, raw slices of potatoes were immersed in the heated lard initially at a temperature of about 355° F. Upon introduction of the potato chips, the temperature dropped appreciably, and the oil was heated further until a temperature of about 320° F. was attained. At this point, the potato chips developed a golden brown color and were considered suitably fried. This is a common procedure for preparing potato chips. The potato chips were then withdrawn and permitted to drain to remove the surplus fat. The potato chips so prepared were then stored at room temperature for a period of five weeks. The flavor as ascertained by a scoring panel of four experts was as follows:

| Lard | Compound Added | Flavor of Potato Chips After 5 weeks at room temperature |
|---|---|---|
| Neutral | None—Control | Poor—rancid. |
|  | 0.05% monostearyl citrate | Fair—strong. |
|  | 0.05% distearyl citrate | Poor—rancid. |
| Proprietary Brand A | None—Control | Poor—rancid. |
|  | 0.05% monostearyl citrate | Fairly good—lardy (not rancid). |
|  | 0.05% distearyl citrate | Poor—rancid. |
| Brand B | None—Control | Poor—rancid. |
|  | 0.05% monostearyl citrate | Fairly good—lardy (not rancid). |
|  | 0.05% distearyl citrate | Poor—rancid. |
| Commercial Bulk | None—Control | Poor—rancid. |
|  | 0.05% monostearyl citrate | Fairly good—lardy (not rancid). |
|  | 0.05% distearyl citrate | Poor—rancid. |

It is observed that with all of the lards tested, a definite improvement was obtained by the addition of the monostearyl citrate over the sample of lard to which no monostearyl citrate was added, and also that the lard to which distearyl citrate was added approached the flavor of the control sample to which no ester was added.

After the five week period, the oil in the potato chips was extracted and tested for peroxide number. The results of this testing are given in the following table:

| Lard | Compound Added | Peroxide No. of Fat Extracted after 5 wks. Storage at room temp. |
|---|---|---|
| Neutral | None—Control | 294 |
|  | 0.05% monostearyl citrate | 220 |
|  | 0.05% distearyl citrate | 227 |
| Brand A | None—Control | 58 |
|  | 0.05% monostearyl citrate | 49 |
|  | 0.05% distearyl citrate | 325 |
| Brand B | None—Control | 376 |
|  | 0.05% monostearyl citrate | 113 |
|  | 0.05% distearyl citrate | 359 |
| Commercial Bulk | None—Control | 277 |
|  | 0.05% monostearyl citrate | 15 |
|  | 0.05% distearyl citrate | 211 |

With the neutral and brand A lard, only slight advantage was observed in the samples to which the monostearyl citrate was added, while in brand B and the commercial bulk lard, a definite improvement was observed.

It would appear that the addition of monoesters of citric acid to lard is effective in retarding the flavor deterioration of potato chips cooked in lard containing the monoester of citric acid.

While the flavor stability improvement of potato products fried in glyceridic oils of animal origin and containing dialkyl or dialkylene esters of citric acid is not uniformly marked, such flavor stability improvement is uniformly attained with potato products fried in glyceridic oil of vegetable origin and containing a dialkyl or dialkylene ester of citric acid. For example, potato chips fried in hydrogenated soya bean oil having incorporated therein distearyl citrate do not manifest off-flavor after storage at 95° F. for 4 weeks, whereas potato chips fried in the same hydrogenated soya bean oil without any additive material and stored at 95° F. for the same period have a definite off-flavor. This marked improvement is illustrated in the following table in which the findings of four scorers, expert in the discernment of flavor, are listed for potato chips fried under identical conditions in (1) hydrogenated soya bean oil without any additive (2) the same hydrogenated soya bean oil containing 0.025 or 0.05% of distearyl citrate, the distearyl citrate being incorporated in the oil by means of a 1 to 1 solution of stearic acid and (3) the same hydrogenated soya bean oil containing .025 or 0.05% of monostearyl citrate, the monostearyl citrate being incorporated in the oil by means of a 1 to 1 solution of stearic acid.

*Flavor scorings*

| Identity of Sample | Fresh | 4 weeks at room temperature | 6 weeks at room temperature | 4 weeks at 95° F. | 6 weeks at 95° F. |
|---|---|---|---|---|---|
| Soya bean oil control without any additive. | 1, 2, 3 and 4: Good | 2: Not good; 3 and 4: Soya taste. | 1: Not good-soya taste; 2: Not good; 3 and 4: Str. soya taste. | 1, 3 and 4: Off; 2: Not good. | 1 and 2: Not good; 3 and 4: Str. soya taste. |
| Soya bean oil having incorporated therein 0.05% of monostearyl citrate. | 1, 2, 3 and 4: Good | 2, 3 and 4: Good | 1 and 2: O. K.; 3 and 4: F. Good. | 1: O. K.; 2, 3 and 4: Good. | 1 and 2: F. Good; 3 and 4: Sl. old taste. |
| Soya bean oil having incorporated therein 0.025% of monostearyl citrate. | 1, 2, 3 and 4: Good | 2, 3 and 4: Good | 1 and 2: O. K.; 3 and 4: F. Good. | 1: O. K.; 2 and 3: Good; 4: F. Good. | 1 and 2: O. K—Good; 3 and 4: F. Good. |
| Soya bean oil having incorporated therein 0.05% of distearyl citrate. | 1, 2, 3 and 4: Good | 2, 3 and 4: Good | 1, 3 and 4: F. Good; 2: Fair. | 1: O. K.; 2 and 3: Good; 4: F. Good. | 1: Sl. musty-sweet; 2, 3 and 4: F. Good. |
| Soya bean oil having incorporated therein 0.025% of distearyl citrate. | 1, 2, 3 and 4: Good | 2, 3 and 4: Good | 1: Not liked—sweetish; 2: O. K.; 3 and 4: F. Good. | 1: O. K.; 2, 3 and 4: Good. | 1: Musty-sweet; 2: Fair; 3 and 4: F. Good. |
| Soya bean oil control without any additive. | 1: Off flavor; 2: Good; 3 and 4: Sl. soya taste. | 2: Not Good; 3 and 4: Soya taste. | 1 and 2: Not good—soya taste; 3 and 4: Str. soya taste. | 1 and 4: Off—soya taste; 2: Not Good; 3: Poor. | 1: Not good—soya; 2: Fair; 3 and 4: Str. soya taste. |

The stearic acid was used as a solubilizing agent for both the monostearyl citrate and the distearyl citrate in order to incorporate the esters in the oil without damaging the finished oil. For this purpose, the ester was dispersed in the stearic acid, and the resulting mixture was added to the hydrogenated soya bean oil. The conclusions of each of the scorers who tested the product are indicated in the table by the numerals 1, 2, 3 and 4. These results demonstrate that potato chips fried in hydrogenated soya bean oil having either monostearyl citrate or distearyl citrate at the .025% or 0.05% level are markedly superior from a flavor stability standpoint when stored over a period of weeks to similar products fried in hydrogenated soya bean oil without any additive. In this scoring, no preference was indicated between the mono- and di- compounds up to 4 weeks storage both at room temperature and at 95° F. After six weeks storage, one scorer indicated a definite preference for the potato chips fried in the oil containing the monostearyl citrate, while the other three scorers had no definite preference for the products fried in either the mono- or di- compound. All scorers agreed on the improvement in flavor resulting from the use of the citric acid esters under test. Potato products fried in glyceridic oil containing dialkylene esters of citric acid also do not manifest the usual rapid development of off-flavor.

By the addition of certain active oxygen absorbers, such as α-, β-, or γ-tocopherol, the dialkyl and dialkylene esters of citric acid are effective in retarding the off-flavor of potato products fried in glyceridic oils of animal origin. For example, .005 to .1% by weight of α-tocopherol may be incorporated in lard to which .002 to 1% and preferably .01 to .1% by weight of a dialkyl or dialkylene citrate has been added, and the potato products, such as potato chips, fried in such lard, remain in good condition for relatively prolonged periods.

Some of the mono-alkyl or -alkylene esters of citric acid, such as monoisopropyl citrate, are soluble only to a limited degree in glyceridic oils or mixtures containing glyceridic oils. This is particularly true of the monoalkyl esters of the citric acid in which the alkyl group has less than 10 carbon atoms. While the oil may be heated to dissolve some of these monoalkyl or monoalkylene esters, such heating, particularly if a high temperature is required, materially damages the oil. To facilitate the uniform dispersion of the monoesters throughout the body of the oil, a solubilizing agent may be employed. The monoester is dissolved in the solubilizing agent and the resulting solution mixed, desirably with agitation, throughout the body of the oil. As heretofor discussed, among the solubilizing agents that are satisfactory for this purpose are monoglycerides of fatty acids in which the fatty acids have at least 10 carbon atoms, unsubstituted aliphatic monohydric alcohols having at least 6 carbon atoms, fatty acids having at least 10 carbon atoms, dialkyl or dialkylene esters of citric acid, such as diesters in which the alkyl or alkylene group has at least 8 carbon atoms and trialkyl or trialkylene esters of citric acid such as trialkyl citrates or trialkylene citrates in which the alkyl or alkylene group has at least 8 carbon atoms.

Examples of monoglycerides of fatty acids which may be employed as solubilizing agents are the monostearyl glycerides, monooleyl glycerides, monolauryl glycerides, monopalmityl glycerides and monomyristyl glycerides or mixtures thereof. These monoglycerides as commercially prepared contain substantial amounts of the corresponding diglycerides and traces of the corresponding triglycerides; such monoglycerides as commercially prepared may be employed as the solubilizing agents in the compositions of this invention.

Examples of alphatic monohydric alcohols which may be employed as solubilizing agents are n-hexyl alcohol, 2-ethyl hexyl alcohol, stearyl alcohol, octyl alcohols and myristyl alcohol.

Examples of the fatty acids which may be employed as solubilizing agents are stearic acid, palmitic acid, oleic acid, lauric acid and myristic acid.

Examples of the monoalkyl or monoalkylene esters which may be incorporated in the glyceridic oil are monoethyl citrate, mono n-propyl citrate, monoisopropyl citrate, mono n-butyl citrate, monocrotyl citrate, monoisobutyl citrate, monoisoamyl citrate, mono 2-ethyl hexyl citrate, monolauryl citrate, monomyristyl citrate, monopalmityl citrate, monooleyl citrate and monostearyl citrate.

Examples of the dialkyl esters of citric acid and dialkylene esters of citric acid which may be employed are the diesters of citric acid corresponding to the monoalkyl or monoalkylene citric acid esters heretofor listed. If the diester is to be used as a solubilizing agent, it should preferably have at least 8 carbon atoms in the alkyl or alkylene group. Likewise, examples of the trialkyl or trialkylene esters of citric acid which may be employed as solubilizing agents are those corresponding to the monoalkyl or monoalkylene esters of citric acid, in which the alkyl or alkylene group has at least 8 carbon atoms, heretofore specifically noted.

Instead of incorporating a single monoalkyl or monoalkylene citric acid ester in the glyceridic oil, mixtures of the monoalkyl or monoalkylene esters of citric acid may be incorporated in the glyceridic oil, or if the potatoes are fried in a vegetable oil, mixtures of dialkyl or dialkylene esters of citric acid may be dispersed in the oil. For example, a mixture of different monoalkyl esters of citric acid may be added to the glyceridic oil, or again, different monoalkylene esters of citric acid may be added to the glyceridic oil; or a mixture of a monoalkyl ester and a monoalkylene ester may be employed. Likewise, mixtures of dialkyl or dialkylene esters of citric acid or trialkyl or trialkylene esters of citric acid may be utilized as solubilizing agents. In fact, it has been found convenient to produce the solubilizing agent simultaneously with the monoalkyl or monoalkylene esters of citric acid. This end can be conveniently achieved by reacting an appropriate amount of citric acid with an aliphatic alcohol such as an alkyl or alkylene alcohol having at least 8 carbon atoms to produce the required amount of the monoesters of citric acid together with sufficient amounts of the corresponding di- and/or tri-esters of citric acid to effect solubilizing of the monoesters in the glyceridic oil.

Again mixtures of various solubilizing agents may be utilized to effect uniform dispersion of the monoesters of citric acid throughout the glyceridic oil. For example, a mixture of lauryl alcohol, octyl alcohol, distearyl citrate and tristearyl citrate may be employed to effect the solubilizing of monoisopropyl citrate in a glyceridic oil. Alternately, a mixture of different monoglycerides may be utilized for the solubilizing of the monoesters.

The monoesters and diesters of citric acid incorporated in the glyceridic oil employed for frying the potato products of this invention, are prepared by the esterification of citric acid and a monohydric alcohol such as a primary monohydric alkyl or alkylene alcohol, preferably in proportions which favor the formation of the mono- or di-esters which are desired. If it is desired to incorporate both a mono- and di-alkyl citrate or a mono- and di-alkylene citrate, it is advantageous to prepare a mixture of the mono- and di-esters of citric acid simultaneously. The esterification may be conducted by any of the well-known methods employed for the production of esters, and the resulting reaction mixture which comprises not only the monoester of citric acid and the diester of citric acid but small amounts of the triester of citric acid, is subjected to treatment for the isolation and separation of the mono-, di- and tri-esters of citric acid, if such separation is deemed necessary or desirable. For example, if a substantially pure monoester of citric acid is desired, the reaction mixture containing mono-, di- and tri-esters of citric acid is subjected to treatment with solvents which dissolve the monoester, but do not dissolve any appreciable amounts of the di- and tri-ester; or alternately, solvents which dissolve the di- and tri-ester, but do not dissolve appreciable quantities of the monoester may be used. By repeating the treatments with these solvents, a relatively pure monoester of citric acid may be obtained. In the course of this solvent separation, a substantially pure diester of citric acid may also be obtained. If desired, a mixture comprising monoesters and diesters of citric acid with a lesser amount of the triester may be produced by reacting a monohydric primary or secondary alkyl or alkylene alcohol, for example, with citric acid, by heating to an elevated temperature such as 150° C. under reduced pressure until the reaction is complete. The reaction product without further purification may be incorporated in the glyceridic oil with or without the solubilizing agents or oil coupling agents as required.

Other examples of the mono- and di-esters of citric acid which may be incorporated in the glyceridic oil, are the citric acid esters of the following alcohols: decanols, cosanols, docosanols, 2-ethyl hexenols, octenols, decenols, dodecenols, hexadecenols, cosenols and docosenols.

The potato products of this invention, such as potato chips, whole fried potatoes or French fried potatoes, may be prepared by immersing the potato or a portion thereof in a glyceridic oil heated to a sufficiently high temperature to produce the desired potato product in accordance with customary practice. The primary deviation from the customary practice is that the glyceridic oil contains a monoalkyl or monoalkylene ester of citric acid, and in the case of vegetable glyceridic oils, it may contain a dialkyl or dialkylene ester of citric acid. For example, potato chips may be prepared by immersing thin slices of potatoes in a glyceridic oil, such as hydrogenated soya bean oil containing a monoalkyl ester of citric acid, a dialkyl ester of citric acid, a monoalkylene ester of citric acid or a dialkylene ester of citric acid. The oil may be heated to a sufficiently elevated temperature such as from 225 to 400° F. to produce a golden color on the resulting potato chips. The potato chips may be then drained of surplus oil in the customary manner.

A more comprehensive understanding of this invention is obtained by reference to the following typical examples:

*Example 1.—Production of French fried potatoes in sunflower seed oil containing monostearyl citrate*

French fried potatoes having marked resistance to rancidity on storage are prepared in the usual manner, except that the glyceridic oil, such as sunflower seed oil employed for the frying of the potatoes, contains 0.1% of monostearyl citrate. For this purpose, 1 gram of monostearyl citrate is added to 1000 grams of refined unhydrogenated but deodorized sunflower seed oil. The mixture is heated to approximately 175° F. to effect the relative uniform dispersion of the monostearyl citrate throughout the sunflower seed oil. The raw potatoes are cut into the appropriate sized pieces and immersed in this sunflower seed oil maintained at a temperature of about 350° F. After the potatoes are fried sufficiently to have the desired color, they are withdrawn from the oil and the surplus oil permitted to drain.

The monostearyl citrate is prepared as follows:

120 grams of anhydrous citric acid are dissolved in 200 grams of refined, dry pyridine containing 1.8 grams of concentrated sulfuric acid by mechanical agitation while heating on a steam plate at about 95° C. 20 grams of pure stearyl alcohol are then introduced. The stearyl alcohol is quite insoluble in the reaction mixture, a condition favoring monoester formation since a small concentration of stearyl alcohol in solution is reacted with a large excess of citric acid. The reaction mixture becomes homogeneous after about 4 hours, after which time the reaction mixture is maintained at 40°—50° C. for 16 hours.

The reaction mixture is poured into iced-water containing 75 grams of concentrated sulfuric acid. The aqueous mixture is extracted with ethyl ether and the ether extract is thoroughly washed with dilute hydrochloric acid and then with water and finally dried with anhydrous sodium sulfate. The ethyl ether solution of monostearyl citrate is evaporated, and the residue is crystallized several times from a petroleum ether, the boiling range of which is 80° to 112° C.

A typical melting point of the product is from 74° to 88.5° C., probably depending upon the proportion of symmetrical and unsymmetrical monoesters present. Other typical characteristics are:

|  | Found | Calc'd |
|---|---|---|
| Acid Value | 246 | 253 |
| Saponification Value | 358 | 379 |

*Example 2.—Production of potato chips fried in corn oil containing monoisopropyl citrate*

Potato chips are prepared in the conventional manner except that the oil employed for frying contains monoisopropyl citrate. For this purpose, 5 grams of monoisopropyl citrate is dissolved in 25 grams of monoglycerides prepared from a refined unhydrogenated but deodorized corn oil. The monoglycerides are prepared from the corn oil by reacting glycerine with the corn oil in the presence of sodium carbonate. The amount of oil and glycerine added are such as to produce predominantly the monoglyceride derivative of the fatty acid component of the corn oil.

The solution of the monoisopropyl citrate is added at a temperature of about 90° to 125° F. to 10 kilograms of a refined unhydrogenated but deodorized corn oil suitable for use as a cooking oil. The corn oil prior to the addition of the solution of the monoisopropyl citrate, is heated to a temperature of about 90° to 125° F. The mixture is then agitated to disperse uniformly the monoisopropyl citrate throughout the oil.

Thin slices of raw potato are immersed in the corn oil having incorporated therein the monoisopropyl citrate. The temperature of the oil is about 350° F. After a bright golden color has been imparted to the potato chips, they are withdrawn and the surplus oil permitted to drain.

The monoisopropyl citrate employed is prepared as follows:

Equal parts of USP citric acid and anhydrous isopropyl alcohol are heated together under reflux, without catalyst for 118 hours at 92° C., after which time the acid value of the reaction mixture is found to be about 203.6 and the saponification value 392 (one-half esterified). The alcohol and most of the water of reaction are removed by low temperature evaporation in vacuo.

The residue is taken up with ethyl ether and then thrown out of the ether solution by the addition of a quantity of low-boiling petroleum ether just sufficient to form a precipitate. The precipitate or oily residue is again taken up with ethyl ether and the precipitation with low boiling petroleum ether repeated. This procedure is repeated several times. After final removal of solvent by heating with stirring to 130° C., a typical analysis is:

|  | Found | Calc'd |
|---|---|---|
| Acid Value | 454 | 480 |
| Saponification Value | 709 | 720 |

This product solidifies after long standing and consists of a mixture of about 90% monoester and 10% diester. The resulting product, without further purification, may be used in the corn oil composition heretofor described or any other glyceridic oil composition.

*Example 3.—Production of French fried potatoes in hydrogenated corn oil and containing monooleyl citrate, dioleyl citrate, trioleyl citrate, monostearyl citrate, distearyl citrate and tristearyl citrate*

French fried potatoes are produced in the conventional manner except that the glyceridic oil such as hydrogenated corn oil employed for the frying of the potatoes contains .2% of a mixture of monooleyl citrate, dioleyl citrate, trioleyl citrate, monostearyl citrate, distearyl citrate, tristearyl citrate and some mixed citric acid esters of oleyl and stearyl alcohols. For this purpose, two grams of a mixture of monooleyl citrate, dioleyl citrate, trioleyl citrate, monostearyl citrate, distearyl citrate, tristearyl citrate and the mixed citric acid esters of oleyl and stearyl alcohols are added to 1,000 grams of deodorized and hydrogenated corn oil. The mixture is heated to approximately 175° F. to effect relatively uniform dispersion of the citric acid esters throughout the deodorized and hydrogenated corn oil. The slices of raw potatoes are immersed in this hydrogenated corn oil maintained at a temperature of about 350° F. After the potatoes are fried sufficiently to have the desired color, they are withdrawn from the oil, and the surplus oil permitted to drain.

The mixture of monooleyl citrate, dioleyl citrate, trioleyl citrate, monostearyl citrate, distearyl citrate and tristearyl citrate together with the mixed citric acid esters of oleyl and stearyl alcohols is prepared as follows:

A mixture of 14 kilograms of commercial oleyl alcohol and 14 kilograms of commercial stearyl alcohol is melted and to this mixture are added 10.2 kilograms of anhydrous citric acid. During the addition, the mixture is agitated. The mixture is heated and held for a period of 1¼ hours at 150° C. under reduced pressure. At the end of this period, boiling and foaming ceases substantially. The mixture contains monostearyl citrate, monooleyl citrate and their corresponding di and tri-esters together with the mixed citric acid esters of oleyl and stearyl alcohols.

*Example 4.—Production of potato chips fried in lard and containing monoethyl citrate, diethyl citrate and triethyl citrate*

Potato chips are prepared in the conventional manner except that the lard employed for frying contains monoethyl citrate, diethyl citrate and triethyl citrate. The procedure for the production of the potato chips in accordance with this example is the same as that described in Example 2 with the exception that the glyceridic oil employed is lard and the citric acid esters added are monoethyl citrate, diethyl citrate and triethyl citrate instead of the corn oil and monoisopropyl citrates respectively. To effect the uniform dispersion of the citric acid esters throughout the oil, 50 grams of the mixture of the mono-, di- and tri-ethyl citrates are added to 50 grams of the monoglycerides prepared from the fatty acid components of the lard in a manner similar to that described in Example 2. One cc. of the solution of the mixture of the ethyl citrates in monoglycerides is added to 1,000 grams of lard maintained at a temperature of about 125° F. and agitated to effect dispersion of the composition throughout the lard.

The mixture of monoethyl citrate, diethyl citrate and triethyl citrate is prepared as follows:

96 grams of anhydrous citric acid and 300 cc. of absolute ethanol are refluxed for three days. The excess ethanol is removed by evaporating on a steam bath. Analysis of the resulting mixture showed the following acid and saponification values:

Acid value—258.2
Saponification value—680.7

The amount of monoethyl citrate in the mixture of mono-, di- and tri-ethyl citrates is about 75%.

Pure dialkyl or dialkylene citrates may be added to lard or other glyceridic oil of animal origin if there is also added to the oil a small quantity, such as from .005 to .1% by weight of the oil of an active oxygen absorber, such as α-tocopherol, and the potato products fried in such oil will manifest a marked retardation to deterioration.

*Example 5.—Production of potato chips in hydrogenated soya bean oil containing monooctyl citrate, dioctyl citrate and trioctyl citrate*

Potato chips are produced in the conventional manner except that the oil employed for frying contains a mixture of monooctyl citrate, dioctyl citrate and trioctyl citrate. For this purpose, 1.5 grams of a mixture of monooctyl citrate, dioctyl citrate and trioctyl citrate is dispersed throughout 1,000 grams of hydrogenated and deodorized soya bean oil at a temperature of approximately 175° F. Thin slices of raw potatoes are immersed in the deodorized and hydrogenated soya bean oil containing the citric acid esters at a temperature of about 350° F. After the desired color on the potato chips has been attained, they are withdrawn from the oil, and the surplus oil permitted to drain. The mixture of monooctyl citrate, dioctyl citrate and trioctyl citrate is prepared as follows:

150 lbs. of octyl alcohol (commercial 2-ethyl hexanol) were heated in a closed vessel with 137 lbs. of anhydrous citric acid for 6½ hours at 150–155° C. The reaction product comprised three layers, an upper ester layer, a middle aqueous layer and an almost crystalline sludge. The upper oily layer which comprised mono-, di- and tri-octyl citrates was separated and deodorized for about 1½ hours under reduced pressure at 150° C. The odorless and light-colored and limpid product was found to have an acid value of 147.6 and a saponification value of 435 compared with theoretical values for dioctyl citrate of 135 and 405 respectively. The mixture contained about 20% monooctyl citrate, about 50% dioctyl citrate and the remainder trioctyl citrate.

*Example 6.—Production of French fried potatoes fried in hydrogenated cottonseed oil and containing monolauryl citrate, dilauryl citrate and trilauryl citrate*

French fried potatoes are prepared in accordance with the method described in Example 4 except that 1,000 grams of hydrogenated cottonseed oil and a mixture of monolauryl citrate, dilauryl citrate and trilauryl citrate are used instead of the lard and ethyl citrate esters respectively.

The mixture of monolauryl citrate, dilauryl citrate and trilauryl citrate is prepared as follows:

120 lbs. of anhydrous citric acid are added to 250 lbs. of commercial lauryl alcohol. During the addition, the mixture is agitated. The mixture is held at 150° C. under reduced pressure for a period of 1½ hours. At the end of this period, boiling and foaming ceases substantially. The resulting product, which consists of a mixture of about 10–15% of monolauryl citrate, about 50% of dilauryl citrate and the remainder trilauryl citrate, has an acid value of 118 and a saponification value of 314 compared respectively with theoretical values for pure dilauryl citrate of 105 and 314 respectively.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A process of producing fried potato products which comprises frying a potato product selected from the class consisting of potatoes and portions thereof in a glyceridic oil having incorporated therein a member selected from the class consisting of monoalkyl esters of citric acid, monoalkylene esters of citric acid, dialkyl esters of citric acid and dialkylene esters of citric acid.

2. A process of producing a fried potato product which comprises frying a potato product selected from the class consisting of potatoes and portions thereof in a glyceridic oil having incorporated therein a monoalkyl ester of citric acid.

3. A process of producing a fried potato product which comprises frying a potato product selected from the class consisting of potatoes and portions thereof in a glyceridic oil having incorporated therein a monoalkylene ester of citric acid.

4. A process of producing a fried potato product which comprises frying a potato product selected from the class consisting of potatoes and portions thereof in a vegetable glyceridic oil having incorporated therein a dialkyl ester of citric acid.

5. A process of producing a fried potato product which comprises immersing a potato product selected from the class consisting of potatoes and portions thereof in a glyceridic oil heated to a temperature between 225° and 400° F., said glyceridic oil having incorporated therein a member selected from the class consisting of monoalkyl esters of citric acid, monoalkylene esters of citric acid, dialkyl esters of citric acid and dialkylene esters of citric acid.

6. A fried potato product, the glyceridic oil of which contains a member of the class consisting of monoalkyl esters of citric acid, monoalkylene esters of citric acid, dialkyl esters of citric acid, and dialkylene esters of citric acid.

7. A fried potato product, the glyceridic oil of which contains a monoalkyl ester of citric acid.

8. A fried potato product, the glyceridic oil of which contains a monoalkylene ester of citric acid.

9. A fried potato product, the glyceridic oil of which contains a dialkyl ester of citric acid.

10. A fried potato product, the glyceridic oil of which contains 0.002 to 1% by weight of a monoalkyl ester of citric acid.

11. A fried potato product, the glyceridic oil of which contains 0.002 to 1% by weight of a monoalkylene ester of citric acid.

12. A fried potato product, the glyceridic oil of which contains 0.002 to 1% by weight of a dialkyl ester of citric acid.

13. A fried potato product, the glyceridic oil of which contains 0.01 to .1% by weight of a monoalkyl ester of citric acid.

14. A fried potato product, the glyceridic oil of which contains 0.01 to .1% by weight of a monoalkylene ester of citric acid.

15. A fried potato product, the glyceridic oil of which contains 0.01 to .1% by weight of a dialkyl ester of citric acid.

RALPH H. NEAL.
CHESTER M. GOODING.
HANS W. VAHLTEICH.

REFERENCES CITED

The following references are of record in the file of this patent:

UNITED STATES PATENTS

| Number | Name | Date |
|---|---|---|
| 1,805,458 | Rogers | May 12, 1931 |
| 1,857,274 | Enhardt | May 10, 1932 |
| 2,122,716 | Graves | July 5, 1938 |
| 2,197,269 | Guillanden | Apr. 16, 1940 |
| 2,212,461 | Swartz | Aug. 20, 1940 |
| 2,322,187 | Black | June 15, 1943 |